United States Patent Office 2,751,836
Patented June 26, 1956

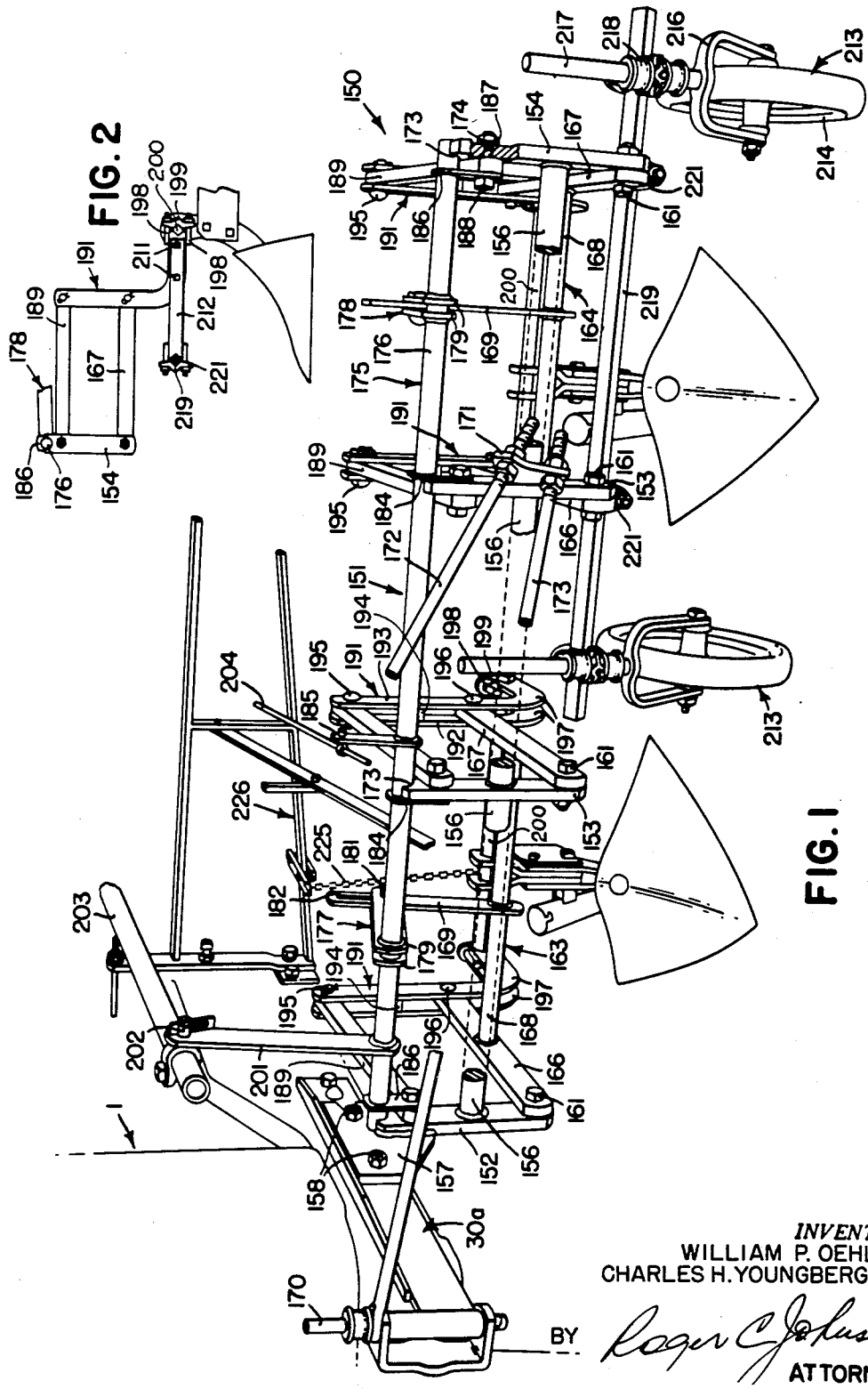

2,751,836

ATTACHMENT FRAME FOR TRACTOR PLANTERS

William P. Oehler and Charles H. Youngberg, Moline, Ill., assignors to Deere & Company, Moline, Ill., a corporation of Illinois Original application March 22, 1950, Serial No. 151,276. Divided and this application August 25, 1952, Serial No. 306,852

2 Claims. (Cl. 97—47.41)

The present invention relates generally to agricultural machines and more particularly to planters and other implements having ground-working units, especially those adapted to be mounted on a farm tractor, and this application is a division of our copending application, Serial No. 151,276, filed March 22, 1950, now abandoned.

The object and general nature of the present invention is the provision of a new and improved attachment frame for connecting planting and/or fertilizing units with a tractor, and more particularly it is a feature of the present invention to provide an attachment frame in which different kinds of ground-working units may readily be accommodated.

More specifically, it is a feature of this invention to provide a simple, sturdy and inexpensive attachment frame, whereby planting units of different kinds may readily be attached to or disconnected from a tractor, whereby the down time for the tractor, required for changing implements and the like in shifting the tractor from one service to another, is substantially reduced. Still further, another feature of this invention is the provision of a planter attachment frame having reversible standards whereby units requiring a well forward position of mounting may be accommodated and, likewise, by reversing the standards, units requiring a more rearward mounting are also accommodated.

These and other objects and advantages of this invention will be apparent to those skilled in the art after a consideration of the following detailed description, taken in conjunction with the accompanying drawings, in which:

Figure 1 is a perspective view of an attachment frame incorporating the principles of the present invention and adapted and constructed for four-row operation.

Figure 2 is a side view of the attachment frame and associated parts shown in Figure 1.

The present invention is particularly concerned with the provision of attachment frames for a four-row outfit, and according to the principles of our invention the attachment frame construction for a four-row outfit comprises right- and left-hand attachment frames, each of which is indicated in its entirety by the reference numeral 150, and since the attachment frames are identical, except parts may be right-hand or left-hand, as desired, a detailed description of one of the frames 150 will suffice. Each unit 150 includes a supporting frame structure 151 which includes a generally vertically disposed inner bracket 152, intermediate brackets 153 and an outer bracket 154. The several brackets are rigidly connected together by a relatively heavy bar 156 to which the intermediate portions of the several brackets 152—154 are rigidly connected, as by welding. Secured to the upper portion of the laterally innermost bracket 152 is an attachment plate 157 which is apertured at its front and rear portions to receive bolts or studs 158 which are arranged to fix the associated frame structure 151 to a quick-detachable frame structure 30a. Preferably, the aperture in the plate 157 receiving the rear stud 158 is slotted. The lower end of each of the brackets 152—154 is apertured to receive a pivot member 161 by which the associated portion of two rigid hitch units 163 and 164 is pivoted thereto. The rigid units 163 and 164 are substantially identical, each comprising a pair of arms 166 and 167 rigidly interconnected by means of a crossbar 168, the ends of which are rigidly secured, as by welding, to the intermediate or central portions of the arms 166 and 167. Before the parts are welded together the lower apertured end of a lifting link 169 is placed over the transverse bar 168. The forward ends of the rigidly interconnected arms 166 and 167 are pivotally connected by means of the above mentioned pivots 161 to the associated brackets, the unit 163 being connected to the inner pair of brackets 152, 153 and the laterally outer rigid unit 164 being pivotally connected to the outer pair of brackets 153, 154. A brace rod bracket 171 is fixed, as by welding, to the support bar 156 closely adjacent the laterally outer intermediate bracket 153, the brace rod bracket 171 being apertured to receive a pair of brace rods 172 and 173 which at their inner ends are connected to upper and lower portions of a vertical bar 170 that forms a part of the articulated quick-detachable frame 30a.

The upper end of each of the brackets 152—154 is provided with an upwardly facing, generally semi-circular socket 173, and a short distance below the socket each of the brackets is provided with a tapped opening 174. Rockably mounted in the several sockets 173 is a rockshaft unit 175 which includes a rockshaft 176 of substantially the same length as the transverse support bar 156 and a pair of lifting arms 177 and 178, each of which includes a pair of spaced-apart members 179 welded at their inner ends to the rockshaft 176. The members 179 are spaced apart so as to receive the upper ends of the lifting links 169, the outer ends of the members 179 being apertured to receive pivots 181 by which the lifter links 169 are connected thereto. Preferably, the upper ends of the lift links are slotted, as at 182, so as to provide for a limited amount of up and down movement of the lifter units 163 and 164 relative to one another and relative to the lift arms 177 and 178. Before the parts constituting the rockshaft unit 175 are welded together, apertured straps 184 are placed on the shaft 176 between the lift arms 177 and 178, and a clutch-controlling arm 185 is also placed on the shaft 176, and then the lift arms 177 and 178 and the clutch-controlling arm 185 are welded to the shaft 176. The latter is of such length as to be disposable in the sockets 173 of the several brackets 152—154, and auxiliary apertured straps 186 are disposable on the innermost and outermost end portions of the rockshaft 176. Each of the straps 184 and 186 is apertured so as to receive pivots 188 which, being carried or connected with the several brackets 152—154, serve to connect the straps 184 and 186 to the brackets and thereby serve to hold the rockshaft 176 in position. Preferably, the pivots 188 are in the form of stud bolts which are screwed into the threaded openings 174 in the brackets 152—154 and held in position by lock nuts 187. The pivots 188 also serve to connect generally rearwardly extending upper links 189 to the brackets 152—154, the links 189 extending generally parallel to the lower pairs of arms 166, 167.

Pivotally connected to the rear ends of the upper links 189 and the lower pairs of rigidly interconnected arms 166 and 167 are two pairs of generally vertically disposed standards 191. Each standard 191 includes laterally spaced apart generally L-shaped bars 192 and 193, held in spaced-apart relation, so as to receive the rear ends of the links 189 and the arms 166, 167, by a lug 194 disposed between each pair of bars 192 and 193. Pivots 195 and 196 serve to connect the rear ends of the links and arms to the vertical portions of the standard bars 192 and 193, and the lower portions of the latter are provided with generally horizontally extending sections 197 which carry spread bar clamping means, described below, to receive spread bar means 200 (Figure 1). The pivots 195 and 196 are of the quick-detachable type and provide for the ready disconnection of the standards 191 so as to permit positioning the latter with the horizontal extensions disposed either forwardly or rearwardly, according to the type of tools to be connected to the spread-bar-receiving clamps. The latter include upper and lower studs 198 welded at one end to the extremities of the horizontal bar sections 197, the end of the latter being shaped to provide a V-shaped, horizontally facing notch. The outer ends of the studs 198 are threaded so as to receive nuts by which a clamping cap 199, also having a V-shaped notch, may be fixed to the associated standard.

Welded to the inner end portion of the rockshaft 176 is a lift arm 201 which is apertured at its upper end to receive a quick-detachable pin 202 by which the lift pipe 203 of the tractor power lift apparatus may be connected thereto. The clutch-operating arm 185 is also apertured at its upper end to receive a link 204 which extends rearwardly to a seeding drive clutch, but since the latter does not form a part of the present invention disclosure of the same has been omitted from the description.

In using the four-row attachment frame units it is desirable to provide ground-engaging means associated with each laterally outer ground-working unit for determining the operating position of the laterally outer unit independently of the laterally inner unit. The standards 191 of the laterally outer lift unit 164 are apertured to provide for the insertion of bolts 211 by which a pair of horizontally extending arms 212 may be rigidly fixed to the laterally outer pair of standards 191. Connected to the forward end of each of the arms 212 is a gauge wheel unit 213, the latter preferably including a gauge wheel 214 and a gauge wheel fork and spindle unit 216, the spindle 217 of which is mounted for rocking movement about a generally vertical axis in a clamp 218 that is fixed to a forward spread bar 219 which is fixed to the forward ends of the arms 212 by suitable clamp means 221. Thus, the gauge wheels 214 control the position of the laterally outer ground-working units. The depth of operation of the laterally inner ground-working units may be controlled by a limit chain 225 which is connected at its lower end in any suitable way to the runner frame or other suitable part of the laterally inner ground-working unit and at its upper end to some convenient point on the tractor, as to an adjacent portion of the bracket 226 which carries the seed and fertilizer hoppers on the tractor 1. The lift arms 177 and 178 are welded to the rockshaft 176 in such relative positions thereon that the laterally outer arm 177 is displaced angularly about four degrees forward, relative to the laterally inner arm 178. This compensates for torsional deflection in the lifting rockshaft 176 and causes both laterally inner and outer ground-working units to be raised to substantially the same transport position.

While we have shown and described the preferred structure in which the principles of the present invention have been incorporated, it is to be understood that our invention is not to be limited to the exact details, shown and described above, but that, in fact, widely different means may be employed in the practice of the broader aspects of our invention.

What we claim, therefore, and desire to secure by Letters Patent is:

1. In an agricultural implement adapted to be mounted on a tractor: the improvement comprising an attachment frame adapted to be attached to the tractor and including two pairs of laterally spaced apart normally vertically disposed brackets, a transverse member rigidly connected to said brackets intermediate the ends of the latter, said brackets being fixed to said transverse member at laterally spaced apart points on the latter generally from the inner end portion to the outer end portion thereof, a first pair of generally rearwardly extending arms pivotally connected at their forward ends to the lower ends of the inner pair of brackets, a second pair of generally rearwardly extending arms pivotally connected at their forward ends to the lower ends of the outer pair of brackets, a transverse connecting bar rigidly connected at its ends to the arms of each pair of arms intermediate their ends so as to constrain said pairs of arms, respectively, for up and down movement together and to restrain lateral deflection of said arms, two pairs of upper links pivotally connected at their forward ends to the upper ends of said brackets, a transverse shaft rockably mounted in the upper ends of said brackets, and two pairs of normally vertically disposed standards, each having at its lower end a portion disposed in a generally horizontal fore and aft extending direction and carrying tool-receiving means, means for pivotally connecting the rear ends of said arms and links to the vertical portions of said standards, said pivotal connecting means being detachable and providing for a reverse mounting of said standards, whereby they may be mounted with said tool-receiving portions extending either forwardly or rearwardly, and a pair of lift arms fixed to said transverse shaft and connected with said transverse connecting bars for raising said rigidly interconnected arms and the associated standards connected therewith.

2. In an agricultural implement adapted to be mounted on a tractor: the improvement comprising an attachment frame adapted to be attached to the tractor and including two pairs of laterally spaced apart normally vertically disposed brackets, a transverse member rigidly connected to said brackets intermediate the ends of the latter, said brackets being fixed to said transverse member at laterally spaced apart points on the latter generally from the inner end portion to the outer end portion thereof, a first pair of generally rearwardly extending arms pivotally connected at their forward ends to the lower ends of the inner pair of brackets, a second pair of generally rearwardly extending arms pivotally connected at their forward ends to the lower ends of the outer pair of brackets, a transverse connecting bar rigidly connected at its ends to the arms of each pair of arms intermediate their ends so as to constrain said pairs of arms, respectively, for up and down movement together and to restrain lateral deflection of said arms, two pairs of upper links pivotally connected at their forward ends to the upper ends of said brackets, a transverse shaft rockably mounted in the upper ends of said brackets, and two pairs of normally vertically disposed standards, each having at its lower end a portion disposed in a generally horizontal fore and aft extending direction and carrying tool-receiving means, means for pivotally connecting the rear ends of said arms and links to the vertical portions of said standards, and a pair of arms fixed to said transverse shaft and connected with said transverse connecting bars for raising said rigidly interconnected arms and the associated standards connected therewith.

References Cited in the file of this patent

UNITED STATES PATENTS

| | | |
|---|---|---|
| 2,319,737 | Johnson | May 18, 1943 |
| 2,327,937 | Smith | Aug. 24, 1943 |
| 2,332,616 | Tuft | Oct. 26, 1943 |
| 2,337,662 | Johnson | Dec. 28, 1943 |
| 2,349,343 | Graham | May 23, 1944 |
| 2,376,559 | Smith | May 22, 1945 |
| 2,453,390 | Werner | Nov. 9, 1948 |